UNITED STATES PATENT OFFICE.

GEORG GIULINI, OF LAZZAGO, NEAR COMO, ITALY.

PRODUCTION OF ALUMINIUM.

1,257,995. Specification of Letters Patent. Patented Mar. 5, 1918.

No Drawing. Application filed April 29, 1913. Serial No. 764,337.

*To all whom it may concern:*

Be it known that I, GEORG GIULINI, chemist, a subject of the King of Italy, residing at 1 Strada Varesina, Lazzago, near Como, Kingdom of Italy, have invented a new and useful Improvement in Production of Aluminium; and I do hereby declare the following to be a full, clear, and exact description of the same.

Repeated attempts have been made to produce aluminium by reducing alumina with carbon, according to the equation $$Al_2O_3 + 3C = 2Al + 3CO:$$

but up to the present they have merely furnished a mixture, consisting of the raw materials, aluminium carbid and very small quantities of aluminium.

According to the present invention it has been found quite feasible to reduce aluminium compounds, for example, alumina, to aluminium, by means of carbon, at a high temperature, below the melting point of aluminium oxid provided care be taken to insure the immediate removal of the gaseous products of the reaction, carbon monoxid for example, and to prevent the highly heated aluminium, which is in the state of vapor, from reacting inversely with the carbon monoxid, etc., according to the equations.

$$2Al + 3CO = Al_2O_3 + 3C:$$

$$4Al + 3C = Al_4C_3.$$

It is also important that the reaction should be carried on entirely out of contact with air, since the aluminium vapor and the highly heated molten aluminium combine at once with the oxygen of the air to form oxid, and with the nitrogen to form nitrid. The aluminium is, in the greater part, directly obtained in the molten condition during the reduction.

In accordance with these novel and hitherto unknown conditions, the process according to the present invention consists in heating, the reaction mixture of the aluminium compound and carbon to a high temperature, below the melting point of aluminium oxid out of contact with air, and continuously removing the resulting gaseous products of the reaction. This removal of the gaseous products is best effected by allowing the reaction to proceed *in vacuo* or under reduced atmospheric pressure, the gaseous products being withdrawn by the vacuum pump or other apparatus employed. By thus employing a vacuum or reduced atmospheric pressure the aluminium vapors can be quickly removed from the superheated zone. The aluminium is volatilized and brought to a temperature at which it is no longer capable of reacting with any carbon or carbon monoxid present. At the same time the concentration of the carbon monoxid formed is so low that even the aluminium which is distilling over comes in contact to only a very slight extent with carbon monoxid.

The heating of the mixture of alumina and carbon to the temperature of the reaction can be effected either by the combustion of fuel materials or by means of the electric current. The employment of the electric current insures the advantage of greater concentration of the heat.

I claim:

1. The process for the production of aluminium which consists in heating aluminium oxid with carbon to a high temperature and creating and maintaining a vacuum in the furnace.

2. The process for the production of aluminium which consists in heating aluminium oxid with carbon to a high temperature below the melting point of the aluminium oxid and creating and maintaining a vacuum in the furnace.

3. The process for the production of aluminium which consists in heating aluminium oxid with carbon to a high temperature below the melting point of the aluminium oxid and above the volatilizing point of aluminium while creating and maintaining a vacuum in the furnace.

In testimony whereof, I have signed my name to this specification in the presence of two subscribing witnesses.

GEORG GIULINI.

Witnesses:
 FRANK HOGAN,
 ALFRED R. ANDERSON.

Copies of this patent may be obtained for  each, by addressing the "Commissioner of Patents, Washington, D. C."